(12) United States Patent
Mumcu et al.

(10) Patent No.: US 12,225,142 B2
(45) Date of Patent: Feb. 11, 2025

(54) 3D PRINTED PHYSICALLY UNCLONABLE WIRELESS SYSTEMS (PUWS)

(71) Applicant: University of South Florida, Tampa, FL (US)

(72) Inventors: Gokhan Mumcu, Tampa, FL (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 301 days.

(21) Appl. No.: 17/683,637

(22) Filed: Mar. 1, 2022

(65) Prior Publication Data

US 2022/0278856 A1 Sep. 1, 2022

Related U.S. Application Data

(60) Provisional application No. 63/155,002, filed on Mar. 1, 2021.

(51) Int. Cl.
H04L 9/32 (2006.01)

(52) U.S. Cl.
CPC ........ *H04L 9/3278* (2013.01); *H04L 2209/80* (2013.01)

(58) Field of Classification Search
None
See application file for complete search history.

(56) References Cited

U.S. PATENT DOCUMENTS

| 10,366,378 B1 | 7/2019 | Han et al. |
| 2014/0126306 A1* | 5/2014 | Otterstedt ............. H04L 9/3263 |
| | | 365/189.07 |

(Continued)

FOREIGN PATENT DOCUMENTS

WO 2020/049452 A1 3/2020

OTHER PUBLICATIONS

Church, "Multimaterial and Multilayer Direct Digital Manufacturing of 3-D Structural Microwave Electronics", 2017, Proceedings of the IEEE, pp. 688-701. (Year: 2017).*

(Continued)

*Primary Examiner* — Benjamin E Lanier
(74) *Attorney, Agent, or Firm* — Meunier Carlin & Curfman LLC (57) ABSTRACT

Three-dimensional (3D) printing is implemented to introduce randomness into systems and devices that are being manufactured. 3D printed physically unclonable wireless systems (PUWS) provide flexibility in system package complexity, number of physically unclonable function (PUF) based security measures/types, and customization of the PUF parameters. Using flexibility and economics of 3D printing, PUWS can combine multiple PUF measures in a 3D package for cryptographic secret keys and introduce PUFs at the physical layer of the communication system. A 3D printed wireless system packaging concept is described herein where 3D printing parameters are randomized to 1) generate new physically unclonable functions (at the physical layer), 2) generate new physically unclonable functions within the system package (rather than at integrated circuit (IC) level), and 3) combine multiple physically unclonable functions (such as optical and electrical/VIA based ones) within single device structure.

19 Claims, 7 Drawing Sheets

(56) References Cited

U.S. PATENT DOCUMENTS

| | | | |
|---|---|---|---|
| 2017/0055128 A1 | 2/2017 | Smith | |
| 2018/0103374 A1* | 4/2018 | Huang | H04L 63/0876 |
| 2019/0334730 A1* | 10/2019 | Endress | H04L 9/3278 |
| 2019/0348767 A1* | 11/2019 | Amyotte | H01Q 21/065 |
| 2020/0052912 A1* | 2/2020 | Lu | H04L 9/30 |
| 2021/0258138 A1* | 8/2021 | Mandecki | G06K 19/0723 |
| 2022/0234378 A1* | 7/2022 | Jackson | B42D 25/405 |
| 2022/0271953 A1* | 8/2022 | Zeh | G09C 1/00 |

OTHER PUBLICATIONS

International Search Report and Written Opinion mailed Aug. 24, 2022, from International Application No. PCT/US2022/018260, 13 pages.

\* cited by examiner

300 – STL file preparation

FIG. 3A

350 – Bed preparation

FIG. 3B

370 – Z-height (tip-to-surface distance) adjustment

FIG. 3C

400 — File preparation

*FIG. 4A*

450 — Print job generation

3D PRINTED PHYSICALLY UNCLONABLE WIRELESS SYSTEMS (PUWS)

CROSS-REFERENCE TO RELATED APPLICATIONS

This application claims the benefit of U.S. provisional patent application No. 63/155,002, filed on Mar. 1, 2021, and entitled "3D PRINTED PHYSICALLY UNCLONABLE WIRELESS SYSTEMS (PUWS)," the disclosure of which is expressly incorporated herein by reference in its entirety.

FIELD

The disclosure generally relates to methods and systems implementing three-dimensional (3D) printing to introduce randomness into systems and devices that are being manufactured.

BACKGROUND

There are many publications on physically unclonable functions; however, they use conventional layer to layer manufacturing technology and are very expensive. Moreover, none of them are being carried out with 3D printing.

In addition, combinations of different physically unclonable functions (PUFs) in a single package are not available.

It is with respect to these and other considerations that the various aspects and embodiments of the present disclosure are presented.

SUMMARY

Three-dimensional (3D) printing is implemented to introduce randomness into systems and devices that are being manufactured. The systems and methods described herein also provide for the implementation of fingerprinting/security at a physical layer of a communication system by randomization/manipulation of parameters of the passive radio frequency (RF) devices, antennas, and antenna arrays.

A physically unclonable wireless system (PUWS) as described herein provides wireless system engineers an unprecedented flexibility in a number of physically unclonable function (PUF) based security measures/types, and customization of the PUF parameters. In this concept, PUF approaches that are external to the device/system package (such as optical) or standardized with integrated circuit (IC) manufacturing can be brought together and fully customized/randomized by taking advantages of 3D printed packages.

In an implementation, a physically unclonable wireless system (PUWS) comprises at least one physically unclonable function (PUF), and a substrate on which the at least one PUF is manufactured on, wherein the at least one PUF is manufactured by 3D printing, wherein the 3D printing is configured to provide randomization for the PUWS.

In an implementation, a method of manufacturing a physically unclonable wireless system (PUWS) comprises 3D printing at least one physically unclonable function (PUF) on a substrate, wherein the 3D printing is configured to provide randomization for the PUWS, wherein the 3D printing is realized with randomization of a direct digital manufacturing process (DDM), wherein the DDM comprises a plurality of manufacturing steps that are randomizable, wherein the geometry of the PUWS is randomizable.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The accompanying drawings, which are in and constitute a part of this specification, illustrate certain examples of the present disclosure and together with the description, serve to explain, without limitation, the principles of the disclosure. Like numbers represent the same element(s) throughout the figures.

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

The following description of the disclosure is provided as an enabling teaching of the disclosure in its best, currently known embodiment(s). To this end, those skilled in the relevant art will recognize and appreciate that many changes can be made to the various embodiments of the invention described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Unless defined otherwise, all technical and scientific terms used herein have the same meaning as commonly understood to one of ordinary skill in the art to which this invention belongs. As used in the specification and claims, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur. Publications cited herein are hereby specifically incorporated by reference in their entireties and at least for the material for which they are cited.

Three-dimensional (3D) printed physically unclonable wireless systems (PUWS) provides wireless system and RF engineers an unprecedented flexibility in system package complexity, number of physically unclonable function (PUF) based security measures/types, and customization of the PUF parameters. Using flexibility and economics of 3D printing, PUWS can combine multiple PUF measures in a 3D package for cryptographic secret keys and introduce PUFs at the physical layer of the communication system.

The PUWS described herein provides convenience of manufacturing. PUWS is economically feasible with 3D printing as manufacturing can be randomized with no-cost as opposed to traditional manufacturing approaches. Traditional approaches such as printed circuit board (PCB) use masks for each manufacturing step which is costly. On the other hand, 3D printing mechanism can be randomized at the manufacturing stage with no additional cost. This opens the possibilities of employing multiple PUFs as well as greatly randomized/controlled PUF parameters within a single system package.

A 3D printed wireless system packaging concept is described herein where 3D printing parameters are randomized to 1) generate new physically unclonable functions (at the physical layer), 2) generate new physically unclonable functions within the system package (rather than at integrated circuit (IC) level), and 3) combine multiple physically unclonable functions (such as optical and electrical/VIA based ones) within a single device structure. Inclusion of hardware-based security is expected to enhance security of wireless systems.

Figure 1:
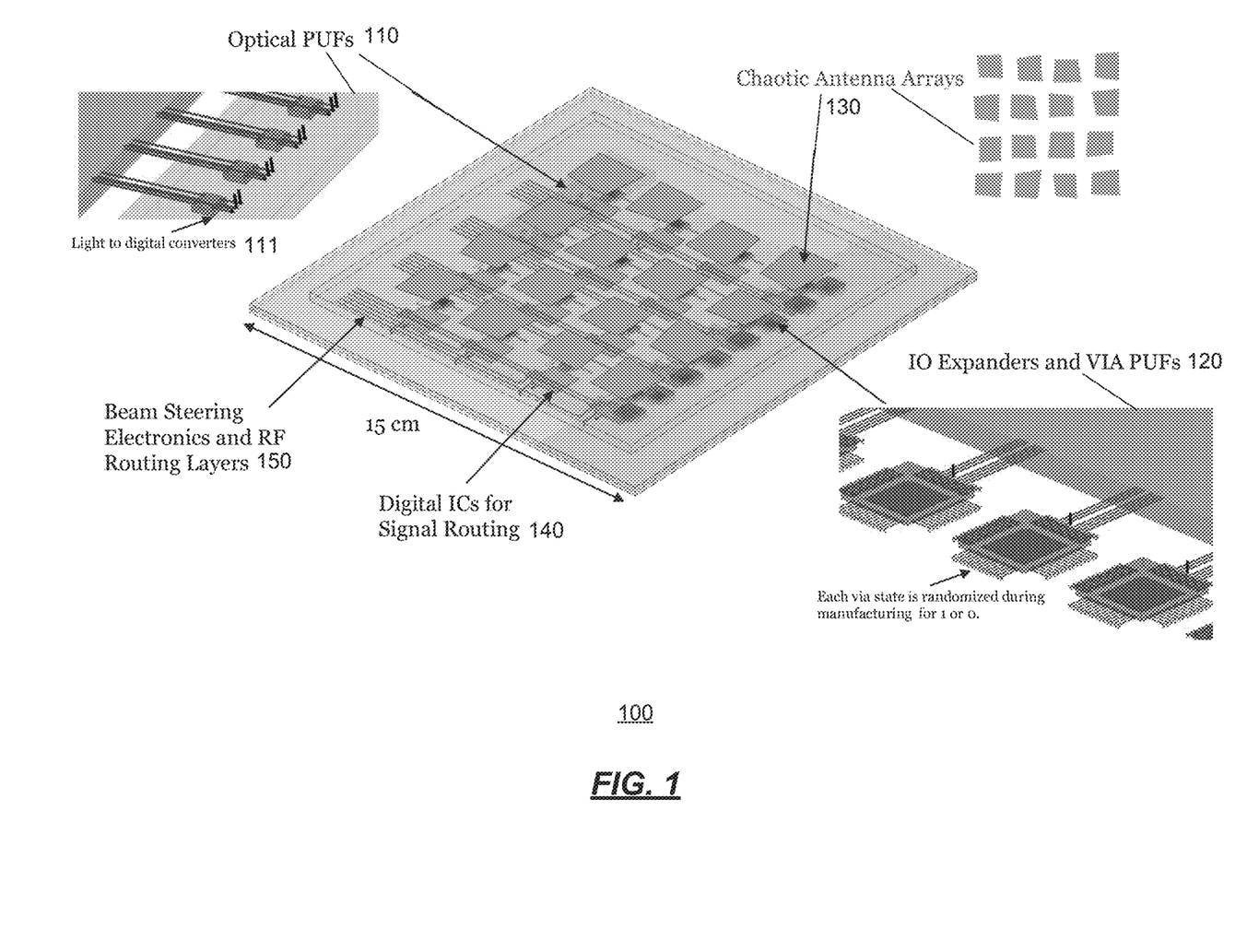
FIG. 1 is an illustration of an implementation of a physically unclonable wireless system (PUWS)

FIG. 1 is an illustration of an implementation of a PUWS 100. The implementation is dimensioned for 5.8 GHz ISM though this is not intended to be limiting.

The PUWS 100 comprises optical PUFs 110 which may be used for authentication and/or cryptology. Light to digital converters 111 are packed within a transparent layer with randomized transparency in-plane and from device to device.

The PUWS 100 also comprises IO expanders and VIA PUFs 120 which may be used for authentication and/or cryptology. Each via state may be randomized during manufacturing for 1 or 0.

The PUWS 100 also comprises chaotic antenna arrays 130 which provide PHY layer security, digital ICs 140 for signal routing, and beam steering electronics and RF routing layers 150. Chaotic antenna arrays are described in US Provisional patent application entitled "Systems and Methods for Authentication Using Antenna Array Geometries" (U.S. Application No. 63/154,992), filed on Mar. 1, 2021, the disclosure of which is expressly incorporated herein by reference in its entirety.

Figure 2:
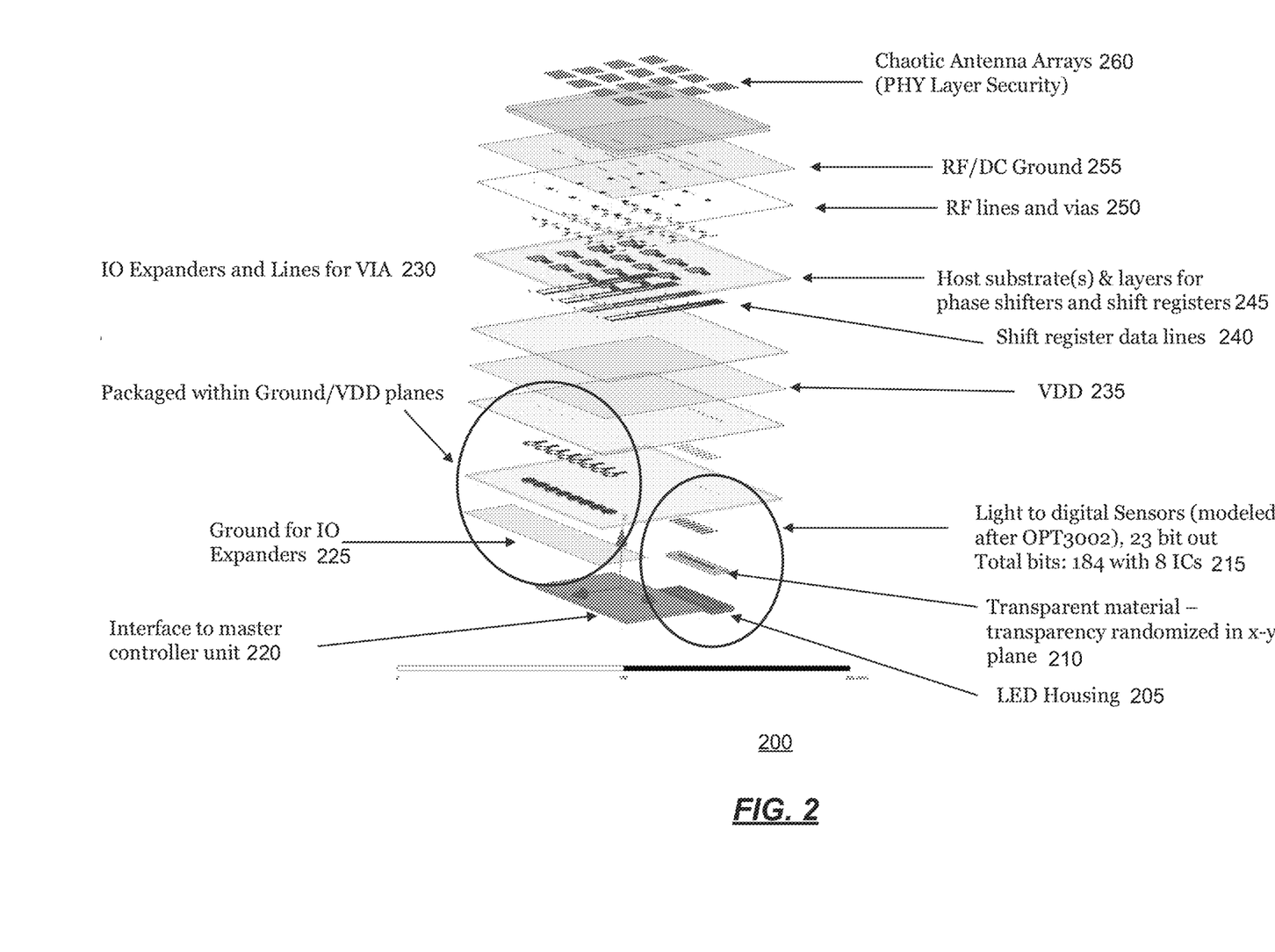
FIG. 2 is an illustration of an exploded view of an implementation of a PUWS.

FIG. 2 is an illustration of an exploded view of an implementation of a PUWS 200. Various layers are shown for the PUWS 200, including an LED housing 205, transparent material 210 which has the transparency randomized in the x-y plane, light to digital sensors 215 (modeled after OPT3002), 23 bit out, with total bits being 184 with 8 ICs.

The PUWS 200 also comprises an interface to master controller unit 220, ground for IO expanders 225, and IO expanders and lines for VIA 230. In an implementation, each expander probes 48 VIAs. In an implementation, the total VIA for PUF is 384 with 8 ICs. It is packaged with ground/VDD planes.

The PUWS 200 also comprises VDD 235, shift register data lines 240, host substrate(s) and layers for phase shifters and shift registers 245, RF lines and vias 250, RF/DC ground 255, and chaotic antenna arrays 260. The chaotic antenna arrays 260 provide PHY layer security.

At the physical layer of communication system there is an inclusion of one or multiple PUFs such as chaotic antenna arrays, RF filters, and other types of passive RF devices to enable fingerprinting and/or security.

At the software/cryptography layer of the communication system, enable multiple PUFs with different operation mechanism within the system package for increased complexity (for example, utilization of light and via based PUFs) to generate hardware specific secret keys. This contrasts to recent research efforts that focus on single type of PUF utilization.

According to some aspects, a PUWS is realized with randomization of direct digital manufacturing process (DDM). DDM combines fused deposition modeling (for dielectric material printing), microdispensing (for conductive paste layers), laser micromachining (subtractive process for fine features), and micromilling (subtractive process for cavities and fine features). All these manufacturing steps can be randomized to realize PUWS along with randomization of geometry created at the design software (such as Ansys HFSS, Keysight ADS, Solidworks, etc.).

Randomizations of manufacturing geometry can also be made in other 3D printing approaches, such as inkjet printing, aerosol jet printing, stereolithography, selective laser sintering, and others.

Figure 3A:
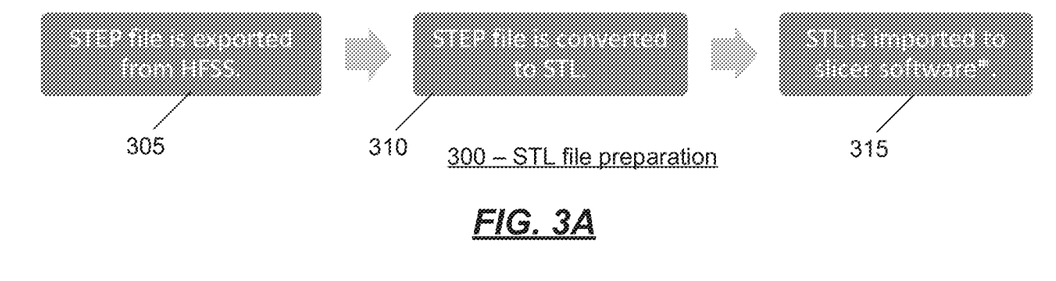
FIGS. 3A, 3B, and 3C show operational flows of implementations of aspects of a method of direct digital manufacturing process (DDM)-fused deposition modeling and potential randomizations for PUWS.
Figure 3B:
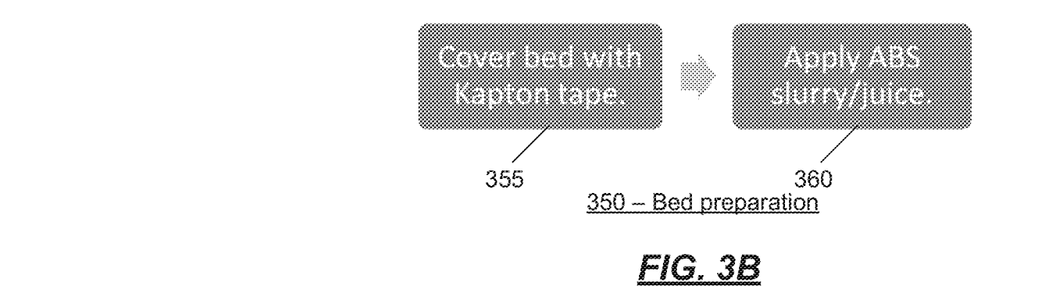
Figure 3C:
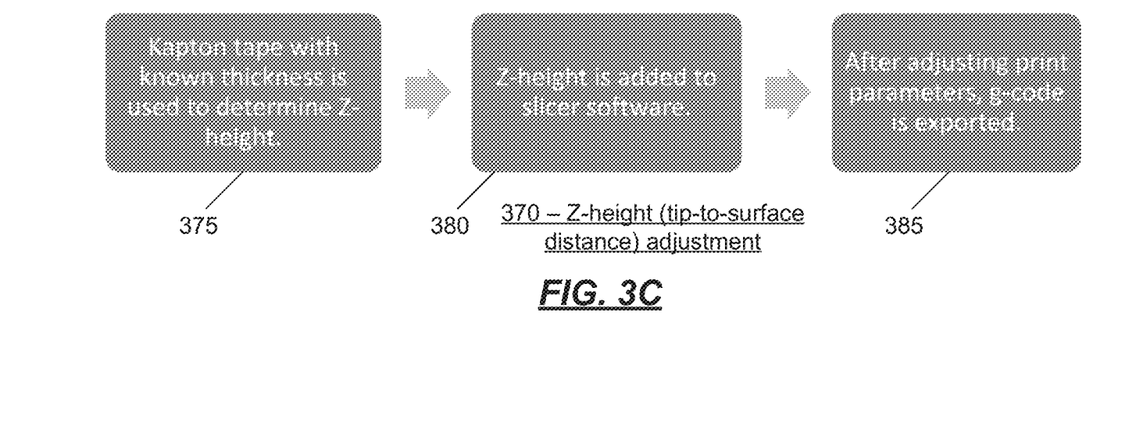

FIGS. 3A, 3B, and 3C show operational flows 300, 350, 370, respectively, of implementations of aspects of a method of direct digital manufacturing process (DDM)-fused deposition modeling and potential randomizations for PUWS.

STL file preparation is performed at 300. It is noted that geometry randomizations can be introduced at each of these operations. Randomization is kept secret. Randomized geometry should still be manufacturable and functional. At 305, STEP file is exported from HFSS. At 310, STEP file is converted to STL. At 315, STL is imported to slicer software. It is used for g-code preparation. Slic3r is a free slicing software with advanced options.

Bed preparation is performed at 350. At 355, cover bed with tape. At 360, apply ABS slurry/juice.

Z-height (tip-to-surface distance) adjustment is performed at 370. Randomization can be introduced at this stage also, in some implementations. At 375, Kapton tape with known thickness is used to determine Z-height. At 380, Z-height is added to slicer software. At 385, after adjusting print parameters, g-code is exported.

Then build the object using Motion Composer or MTGen. Randomization can be introduced at this stage also, in some implementations.

Figure 4A:
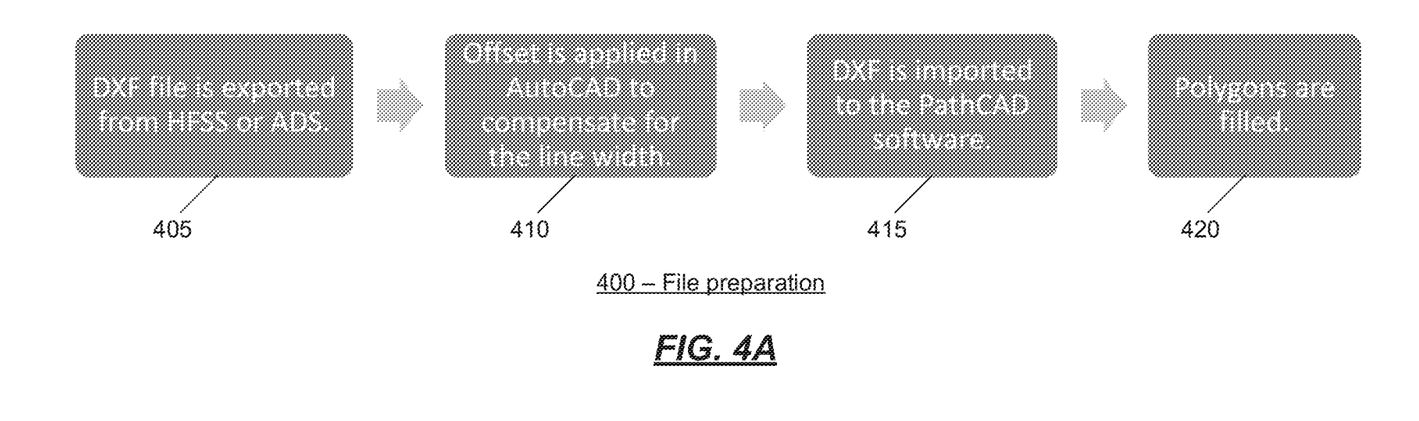
FIGS. 4A and 4B show operational flows of implementations of aspects of a method of DDM-microdispensing and potential randomizations for PUWS.
Figure 4B:
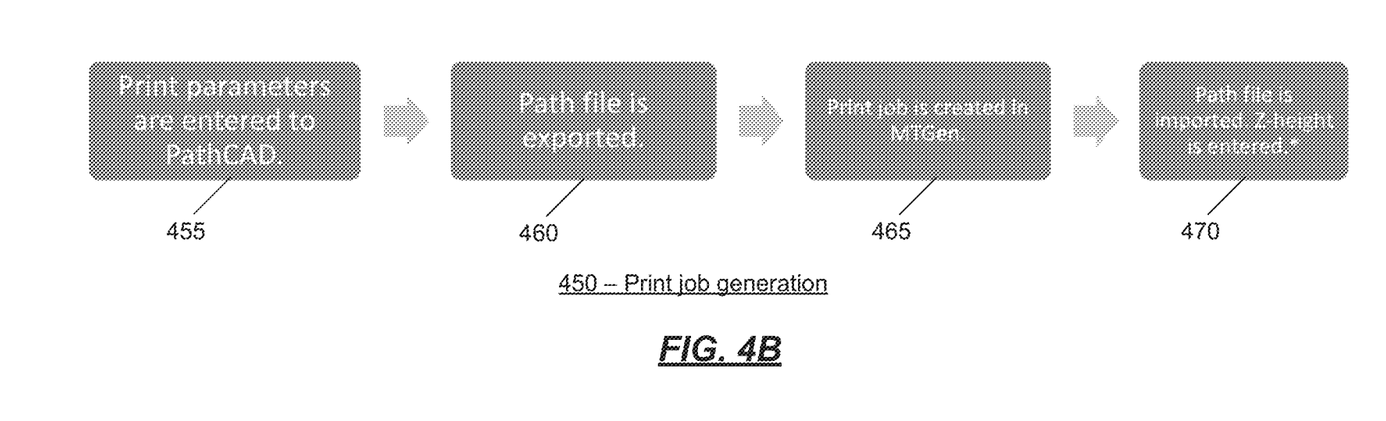

FIGS. 4A and 4B show operational flows 400, 450, respectively, of implementations of aspects of a method of DDM-microdispensing and potential randomizations for PUWS.

File preparation is performed at 400. It is noted that geometry randomizations can be introduced at each of these operations. Randomization is kept secret. Randomized geometry should still be manufacturable and functional. File preparation comprises DXF file is exported from HFSS or ADS at 405. At 410, offset is applied in AutoCAD to compensate for line width. DXF is imported to the PathCAD software at 415. At 420, polygons are filled.

After file preparation is performed, installation of syringe and SmartPump tools is performed. Then air pressure, Z-height (tip-to-surface gap), and closed valve position are adjusted to achieve a certain consistent line width. Valve opening speed, waiting time after valve opening, and valve closing speed are adjusted to avoid sputtering, blotching, or incomplete lines.

At 450, print job generation is performed. It is noted that geometry randomizations can be introduced at each of these operations. Randomization is kept secret. Randomized geometry should still be manufacturable and functional. At 455, print parameters are entered to PathCAD. At 460, path file is exported. At 465, print job is created in MTGen. At 470, path file is imported and Z-height is entered. A combination of Print Script and Grid Mapping Jobs can be used for automated process.

After print job generation is performed, the print job is run, and print quality is confirmed. If print quality is not good, the surface can be cleaned using isopropanol and started again. Then silver paste is dried in-situ or inside a hot air oven. Then remove material, store syringe, and clean microdispensing attachments.

A microdispensing example for PUWS is described. A patch antenna typically comprises a metallized solid rectangle or solid square printed (microdispensed) on a dielectric substrate backed by ground plane. It is possible to realize the patch antenna from metallic meshed squares/rectangles, which is well known in literature.

Figure 5:
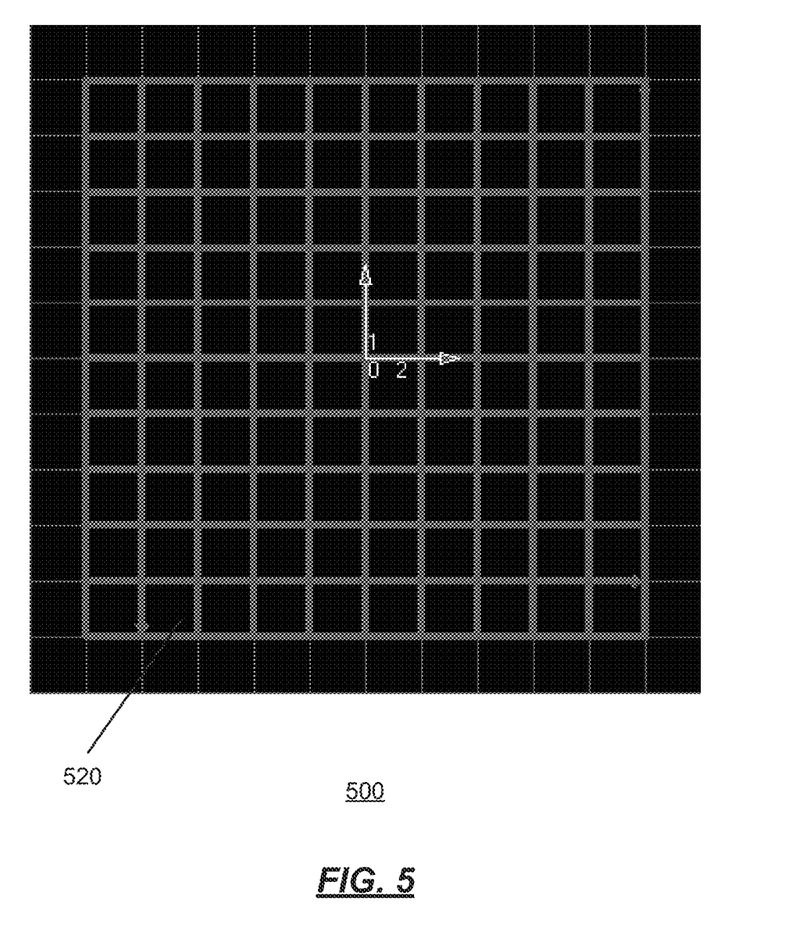
FIG. 5 is an illustration of an image of polylines for an implementation of a square patch antenna.

FIG. 5 is an illustration 500 of an image of polylines for an implementation of a square patch antenna. More particularly, the illustration 500 shows an image of polylines from PCAD. Note the polylines for each square 520 of the square patch antenna are smooth and even. In this manner, the mesh is a grid of geometric squares.

In an implementation, PCAD generates a path file of 15 mm ($0.3\lambda_o$ at 5.8 GHz) square with 1.5 mm spaced grid lines. Micro-dispensing parameters are optimized to increase repeatability. Polylines have edges, horizontal grid lines, and vertical grid lines. There are differential movements in the x and y axes.

It is contemplated that by randomizing the mesh geometry so the lines are not smooth and even (i.e., bit patterns that randomized, uneven, not square or not perfectly square, etc.), security and/or unique identity can be provided, e.g., in the generation of one or more keys using this randomization.

The antenna operates similarly as long as the size of the meshed squares/rectangles are a small fraction of operation wavelength. In this example, a randomization is developed that allows for the manufacture of square patch antennas with randomized mesh geometry.

Figure 6:
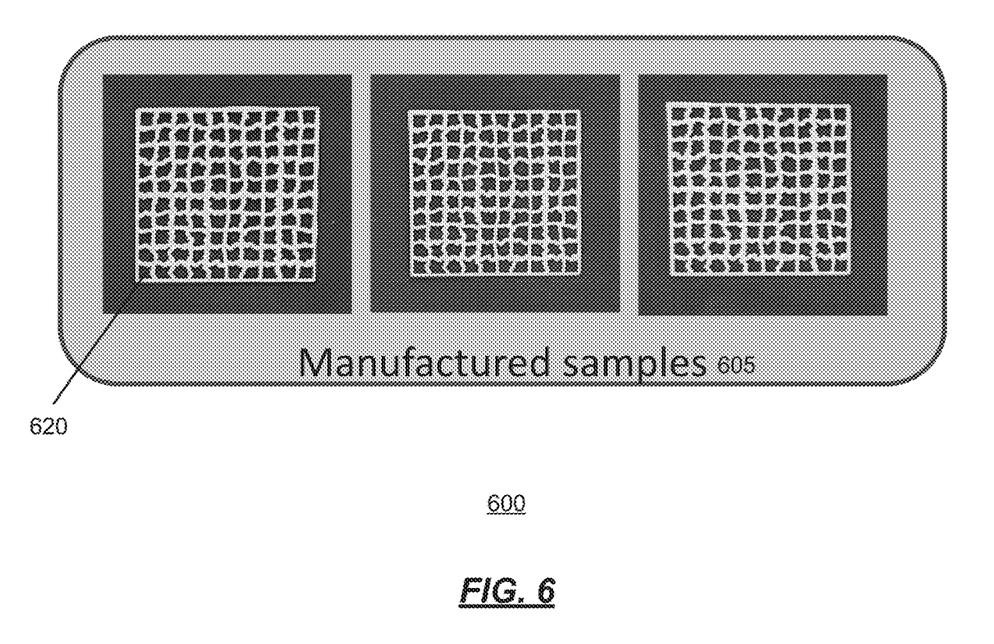
FIG. 6 is an illustration of manufactured square patch antennas with randomized mesh geometry.

FIG. 6 is an illustration 600 of manufactured square patch antennas (manufactured samples 605) with randomized mesh geometry as shown for example in the pattern 620. Implementations may include some or all of the following features. Nonrandomized parts of path file (e.g., edges, valve openings & closings) are stored in different files and appended directly to the generated file. MATLAB code randomizes only the grid lines and generates a path file. In the example, there are nine 15 mm long randomizable edges in horizontal and vertical directions.

All of these shapes will operate as a patch antenna at the same operational frequency, but all of them have different images/shapes—which can be used in implementation of physical layer security as in chaotic antenna arrays disclosure or security based on imaging. Each of the manufactured samples 605 are different from each other, thus providing security.

In an implementation, determine how many pieces each edge consists of. These values are randomly picked from the set {2, 3, . . . , 149, 150} for example, where each element has equal probability. Assume that edge of interest is divided into p pieces. To determine the length of each piece in the direction of motion, pick p random numbers each uniformly distributed between (0,1). Sum of length of the pieces are normalized to be 15 mm. Deviation from the movement axis is limited to ±0.25 mm and it is uniformly distributed between the limits. The type of the movement has a 50% chance of being diagonal, and 50% change of being rectilinear (horizontal+vertical). MATLAB's default random number generator (Mersenne twister) is used and shuffled in each run. One or more cryptographic random number generators may be used.

Figure 7:
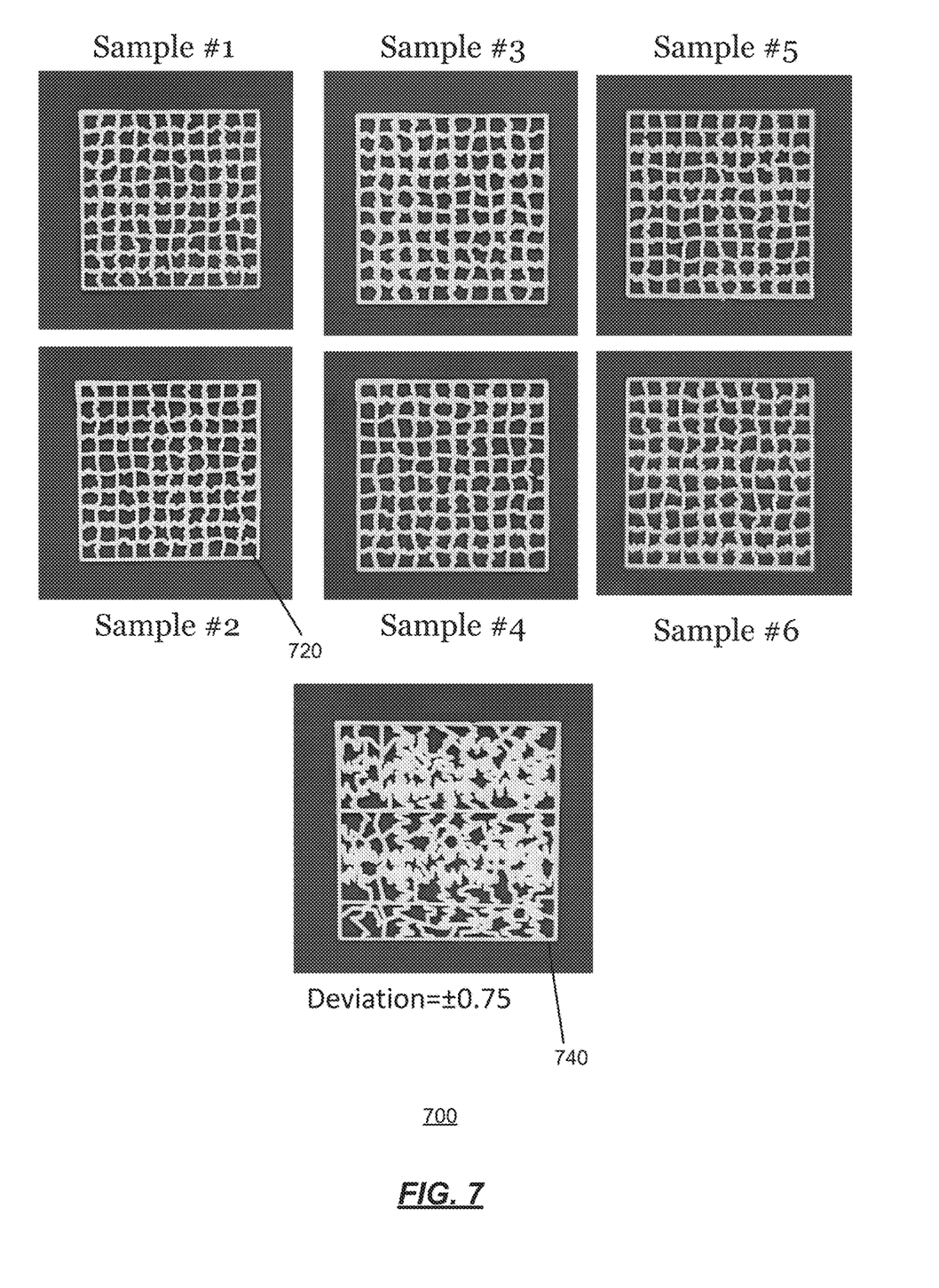
FIG. 7 is an illustration of additional manufactured square patch antennas with randomized mesh geometry.

FIG. 7 is an illustration 700 of additional manufactured square patch antennas with randomized mesh geometries shown in the various samples #1-#6. A randomized mesh geometry is shown for example in the pattern 720. It is noted that if the amount of randomization deviation becomes too great, the mesh geometry may become too randomized and thus become less effective, or in some cases, ineffective. If randomization is too great, then the original shape will be lost. As an example, the sample 740 shows an overly randomized mesh geometry in which the antennas are highly non-uniform and vary in shape greatly. Such a mesh geometry may be ineffective.

In an implementation, a physically unclonable wireless system (PUWS) comprises at least one physically unclonable function (PUF), and a substrate on which the at least one PUF is manufactured on, wherein the at least one PUF is manufactured by 3D printing, wherein the 3D printing is configured to provide randomization for the PUWS.

Implementations may include some or all of the following features. The at least one PUF is at the physical layer of a communication system, wherein the at least one PUF comprises at least one of a chaotic antenna array, an RF filters, or passive RF device. The at least one PUF is configured to enable at least one of fingerprinting or security, and wherein the at least one PUF is at the software/cryptography layer of a communication system. The at least one PUF comprises a first PUF with a first operation mechanism and a second PUF with a second operation mechanism. The first operation mechanism is utilization of light, and the second operation mechanism is via based. The first PUF is an optical PUF configured with a light to digital converter packed within a transparent layer with randomized transparency in plane and from device to device, and the second PUF is a via PUF configured with each via state randomized during manufacturing for 1 or 0. The first PUF and the second PUF are configured to generate hardware specific secret keys. At least one parameter of the at least one PUF is randomizable. The 3D printing is realized with randomization of a direct digital manufacturing process (DDM), wherein the DDM comprises fused deposition modeling for dielectric material printing, microdispensing for conductive paste layers, laser micromachining as a subtractive process for fine features, and micromilling as a subtractive process for cavities and fine features. The DDM comprises a plurality of manufacturing steps that are randomizable. The geometry of the PUWS is randomizable.

In an implementation, a method of manufacturing a physically unclonable wireless system (PUWS) comprises 3D printing at least one physically unclonable function (PUF) on a substrate, wherein the 3D printing is configured to provide randomization for the PUWS, wherein the 3D printing is realized with randomization of a direct digital manufacturing process (DDM), wherein the DDM comprises a plurality of manufacturing steps that are randomizable, wherein the geometry of the PUWS is randomizable.

Implementations may include some or all of the following features. The DDM comprises fused deposition modeling for dielectric material printing, microdispensing for conductive paste layers, laser micromachining as a subtractive process for fine features, and micromilling as a subtractive process for cavities and fine features. The at least one PUF is at the physical layer of a communication system. The at least one PUF comprises at least one of a chaotic antenna array, an RF filters, or passive RF device. The at least one PUF is configured to enable at least one of fingerprinting or security. The at least one PUF is at the software/cryptography layer of a communication system. The at least one PUF comprises a first PUF with a first operation mechanism and a second PUF with a second operation mechanism. The first operation mechanism is utilization of light, and the second operation mechanism is via based, wherein the first PUF and the second PUF are configured to generate hardware specific secret keys. The first PUF is an optical PUF configured with a light to digital converter packed within a transparent layer with randomized transparency in plane and from device to device, and the second PUF is a via PUF configured with each via state randomized during manufacturing for 1 or 0.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

It should be understood that while the present disclosure has been provided in detail with respect to certain illustrative and specific aspects thereof, it should not be considered limited to such, as numerous modifications are possible without departing from the broad spirit and scope of the present disclosure as defined in the appended claims. It is, therefore, intended that the appended claims cover all such equivalent variations as fall within the true spirit and scope of the invention.

What is claimed is:

1. A physically unclonable wireless system (PUWS), comprising:
   at least one physically unclonable function (PUF) at a physical layer of the system;
   at least one PUF at a software layer of the system; and
   a substrate on which the at least one PUF at the physical layer of the system is manufactured on, wherein the at least one PUF at the physical layer of the system is manufactured by 3D printing, wherein the 3D printing is configured to provide randomization for the PUWS, wherein the at least one PUF at the physical layer of the system comprises a chaotic antenna array, wherein the chaotic antenna array comprises a plurality of antennas with a randomized geometry and a plurality of RF routing layers with randomized states, and further wherein the randomized geometry of each antenna of the plurality of antennas is determined during the 3D printing of the at least one PUF by randomizing one or more printing parameters using a cryptographic random number generator.

2. The PUWS of claim 1, wherein the at least one PUF at the physical layer of the system comprises at least one of a chaotic antenna array, an RF filter, or a passive RF device.

3. The PUWS of claim 1, wherein the at least one PUF at the software layer of the system is configured to enable at least one of fingerprinting or security.

4. The PUWS of claim 1, wherein the at least one PUF at the software layer of the system comprises a first PUF with a first operation mechanism and a second PUF with a second operation mechanism.

5. The PUWS of claim 4, wherein the first operation mechanism is utilization of light, and the second operation mechanism is via based.

6. The PUWS of claim 4, wherein the first PUF is an optical PUF configured with a light to digital converter packed within a transparent layer with randomized transparency in plane and from device to device, and the second PUF is a via PUF configured with each via state randomized during manufacturing for 1 or 0.

7. The PUWS of claim 4, wherein the first PUF and the second PUF are configured to generate hardware specific secret keys.

8. The PUWS of claim 1, wherein at least one parameter of the at least one PUF at the physical layer of the system is randomizable.

9. The PUWS of claim 1, wherein the 3D printing is realized with randomization of a direct digital manufacturing process (DDM), wherein the DDM comprises fused deposition modeling for dielectric material printing, microdispensing for conductive paste layers, laser micromachining as a subtractive process for fine features, and micromilling as a subtractive process for cavities and fine features.

10. The PUWS of claim 9, wherein the DDM comprises a plurality of manufacturing steps that are randomizable.

11. The PUWS of claim 1, wherein the geometry of the PUWS is randomizable.

12. A method of manufacturing a physically unclonable wireless system (PUWS), the method comprising 3D printing at least one physically unclonable function (PUF) on a substrate for a physical layer of the system and at least one PUF for a software layer of the system, wherein the 3D printing is configured to provide randomization for the PUWS, wherein the 3D printing is realized with randomization of a direct digital manufacturing process (DDM), wherein the DDM comprises a plurality of manufacturing steps that are randomizable, wherein the geometry of the PUWS is randomizable, wherein the at least one PUF comprises a chaotic antenna, wherein the chaotic antenna array comprises a plurality of antennas with a randomized geometry and a plurality of RF routing layers with randomized states, and further wherein the randomized geometry of each antenna of the plurality of antennas is determined during the 3D printing of the at least one PUF by randomizing one or more printing parameters using a cryptographic random number generator.

13. The method of claim 12, wherein the DDM comprises fused deposition modeling for dielectric material printing, microdispensing for conductive paste layers, laser micromachining as a subtractive process for fine features, and micromilling as a subtractive process for cavities and fine features.

14. The method of claim 12, wherein the at least one PUF for the physical layer of the system comprises at least one of a chaotic antenna array, an RF filter or a passive RF device.

15. The method of claim 12, wherein the at least one PUF is configured to enable at least one of fingerprinting or security.

16. The method of claim 12, wherein the at least one PUF for the software layer of the system is at the software/cryptography layer of a communication system.

17. The method of claim 12, wherein the at least one PUF for the software layer of the system comprises a first PUF with a first operation mechanism and a second PUF with a second operation mechanism.

18. The method of claim 17, wherein the first operation mechanism is utilization of light, and the second operation mechanism is via based, wherein the first PUF and the second PUF are configured to generate hardware specific secret keys.

19. The method of claim 17, wherein the first PUF is an optical PUF configured with a light to digital converter packed within a transparent layer with randomized transparency in plane and from device to device, and the second PUF is a via PUF configured with each via state randomized during manufacturing for 1 or 0.

* * * * *